(12) United States Patent
Pagan et al.

(10) Patent No.: US 9,164,782 B2
(45) Date of Patent: *Oct. 20, 2015

(54) VIRTUAL MACHINE ADMINISTRATION FOR DATA CENTER RESOURCE MANAGERS

(71) Applicant: LENOVO ENTERPRISE SOLUTIONS (SINGAPORE) PTE. LTD., Singapore (SG)

(72) Inventors: William G. Pagan, Durham, NC (US); Devon D. Snyder, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 221 days.

This patent is subject to a terminal disclaimer.

(21) Appl. No.: 13/785,170

(22) Filed: Mar. 5, 2013

(65) Prior Publication Data

US 2013/0179885 A1 Jul. 11, 2013

Related U.S. Application Data

(63) Continuation of application No. 12/646,179, filed on Dec. 23, 2009, now Pat. No. 8,578,375.

(51) Int. Cl.
*G06F 9/455* (2006.01)
*G06F 9/46* (2006.01)
*G06F 9/50* (2006.01)

(52) U.S. Cl.
CPC ............ *G06F 9/455* (2013.01); *G06F 9/45558* (2013.01); *G06F 9/5077* (2013.01); *G06F 2009/45562* (2013.01)

(58) Field of Classification Search
None
See application file for complete search history.

(56) References Cited

U.S. PATENT DOCUMENTS 7,281,247 B2 10/2007 Lodwick et al.
7,299,468 B2 11/2007 Casey et al.
(Continued)

OTHER PUBLICATIONS

Liang, J., et al.; "Self-Configuring Information Management for Large-Scale Service Overlays", 26th IEEE International Conference on Computer Communications, May 6-12, 2007, pp. 472-480, IEEE Xplore (Online), DOI: 10.1109/INFCOM.2007.62.

(Continued)

*Primary Examiner* — Lewis A Bullock, Jr.
*Assistant Examiner* — Kevin X Lu
(74) *Attorney, Agent, or Firm* — Edward J. Lenart; Katherine S. Brown; Kennedy Lenart Spraggins LLP

(57) ABSTRACT

Virtual machine administration for data center resource managers including discovering resources of the datacenter to be managed by a resource manager; determining, in dependence upon attributes of the resources, processing capabilities of the discovered resources; determining, in dependence upon attributes of the resources of the datacenter to be managed, memory capabilities of the discovered resources; determining, in dependence upon attributes of the resources, minimum memory requirements for managing the discovered resources; determining, in dependence upon attributes of the resources of the datacenter to be managed, minimum processing requirements for managing the discovered resources; deploying, in dependence upon the determined processing capabilities and memory capabilities upon one or more of the resources of the datacenter to be managed, a virtual machine having at least the minimum memory requirements and the minimum processing requirements; and deploying the resource manager on the virtual machine.

18 Claims, 5 Drawing Sheets

(56) References Cited

U.S. PATENT DOCUMENTS

| | | |
|---|---|---|
| 2006/0005184 A1* | 1/2006 | Tewari et al. .................. 718/1 |
| 2007/0006307 A1 | 1/2007 | Hahn et al. |
| 2007/0283348 A1* | 12/2007 | White .......................... 718/1 |
| 2008/0163204 A1 | 7/2008 | Morgan et al. |
| 2008/0184229 A1 | 7/2008 | Rosu et al. |
| 2008/0244214 A1 | 10/2008 | Flemming et al. |
| 2009/0044187 A1 | 2/2009 | Smith et al. |
| 2009/0064156 A1 | 3/2009 | He et al. |
| 2009/0089410 A1* | 4/2009 | Vicente ...................... 709/223 |
| 2009/0112972 A1 | 4/2009 | Liu |
| 2009/0157882 A1* | 6/2009 | Kashyap ..................... 709/227 |
| 2009/0164770 A1 | 6/2009 | Zimmer et al. |
| 2009/0172661 A1 | 7/2009 | Zimmer et al. |
| 2009/0254660 A1* | 10/2009 | Hanson et al. ............... 709/226 |
| 2010/0107155 A1* | 4/2010 | Banerjee et al. ............. 717/177 |
| 2010/0162259 A1* | 6/2010 | Koh et al. .................... 718/104 |
| 2010/0242045 A1 | 9/2010 | Swamy et al. |
| 2011/0154324 A1 | 6/2011 | Pagan et al. |

OTHER PUBLICATIONS

Begnum, K., et al.; "Adaptive Provisioning Using Virtual Machines and Autonomous Role-Based Management", International Conference on Autonomic and Autonomous Systems, ICAS'06, Jul. 16-18, 2006, p. 7, IEEE Xplore (Online), DOI: 10.1109/ICAS.2006.9.

Ranganath, H.S., et al.; "Self Partitioning Backpropagation Network for Target Recognition", Visualize the Future, Southeastcon '95, Mar. 26-29, 1995, pp. 30-36, IEEE Xplore (Online), IEEE Proceedings, DOI: 10.1109/SECON.1995.513052.

Office Action, U.S. Appl. No. 12/646,179, Oct. 15, 2012, pp. 1-14.

* cited by examiner

| Resource Contributions 800 | | | |
|---|---|---|---|
| Discovered Resources | Number | Processor Contributions | Memory Contributions |
| Fan Type A | 3 | N/A | N/A |
| Fan Type B | 6 | N/A | N/A |
| Software Module A | 4 | N/A | N/A |
| Compute Node | 2 | 100000 FLOPS | 400000 bytes |
| I/O Module | 5 | N/A | N/A |
| External SAN | 1 | N/A | N/A |
| ↑ 802 | ↑ 804 | ↑ 806 | ↑ 808 |

FIG. 2

| Resource Requirements 700 | | | |
|---|---|---|---|
| Discovered Resources | Number | Processor Requirements | Memory Requirements |
| Fan Type A | 3 | 300 FLOPS | 2 bytes |
| Fan Type B | 6 | 150 FLOPS | 2 bytes |
| Software Module A | 4 | 3000 FLOPS | 80000 bytes |
| Compute Node | 2 | 1000 FLOPS | 4000 bytes |
| I/O Module | 5 | 500 FLOPS | 1000 bytes |
| External SAN | 1 | 1000 FLOPS | 1000 bytes |
| 702 | 704 | 706 | 708 |

FIG. 3

VIRTUAL MACHINE ADMINISTRATION FOR DATA CENTER RESOURCE MANAGERS

CROSS-REFERENCE TO RELATED APPLICATION

This application is a continuation application of and claims priority from U.S. patent application Ser. No. 12/646,179, filed on Dec. 23, 2009.

BACKGROUND OF THE INVENTION

1. Field of the Invention

The field of the invention is data processing, or, more specifically, methods, apparatus, and products for virtual machine administration for data center resource managers.

2. Description of Related Art

Computer systems have become highly virtualized and often support resource managers to configure, maintain, and otherwise administer a large number of resources, typically in data centers. Because the resources may vary the requirements of the virtual machine that supports the manager of those resources may also vary. It is inefficient to deploy a virtual machine with capabilities that the resource manger does not need and it is inoperable to deploy a virtual machine without the capabilities that the resource manger does need.

SUMMARY OF THE INVENTION

Virtual machine administration for data center resource managers including discovering resources of the datacenter to be managed by a resource manager; determining, in dependence upon attributes of the resources, processing capabilities of the discovered resources; determining, in dependence upon attributes of the resources of the datacenter to be managed, memory capabilities of the discovered resources; determining, in dependence upon attributes of the resources, minimum memory requirements for managing the discovered resources; determining, in dependence upon attributes of the resources of the datacenter to be managed, minimum processing requirements for managing the discovered resources; deploying, in dependence upon the determined processing capabilities and memory capabilities upon one or more of the resources of the datacenter to be managed, a virtual machine having at least the minimum memory requirements and the minimum processing requirements; and deploying the resource manager on the virtual machine.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 2 sets forth a table of resource contributions of the example resources discovered and whose management requirements are described with reference to FIG. 3.

FIG. 3 sets forth a table of resource requirements of some example resources discovered and capable of being managed by a resource manager in accordance with the present invention and whose resource contributions are described with reference to FIG. 2.

DETAILED DESCRIPTION OF EXEMPLARY EMBODIMENTS

Figure 1:
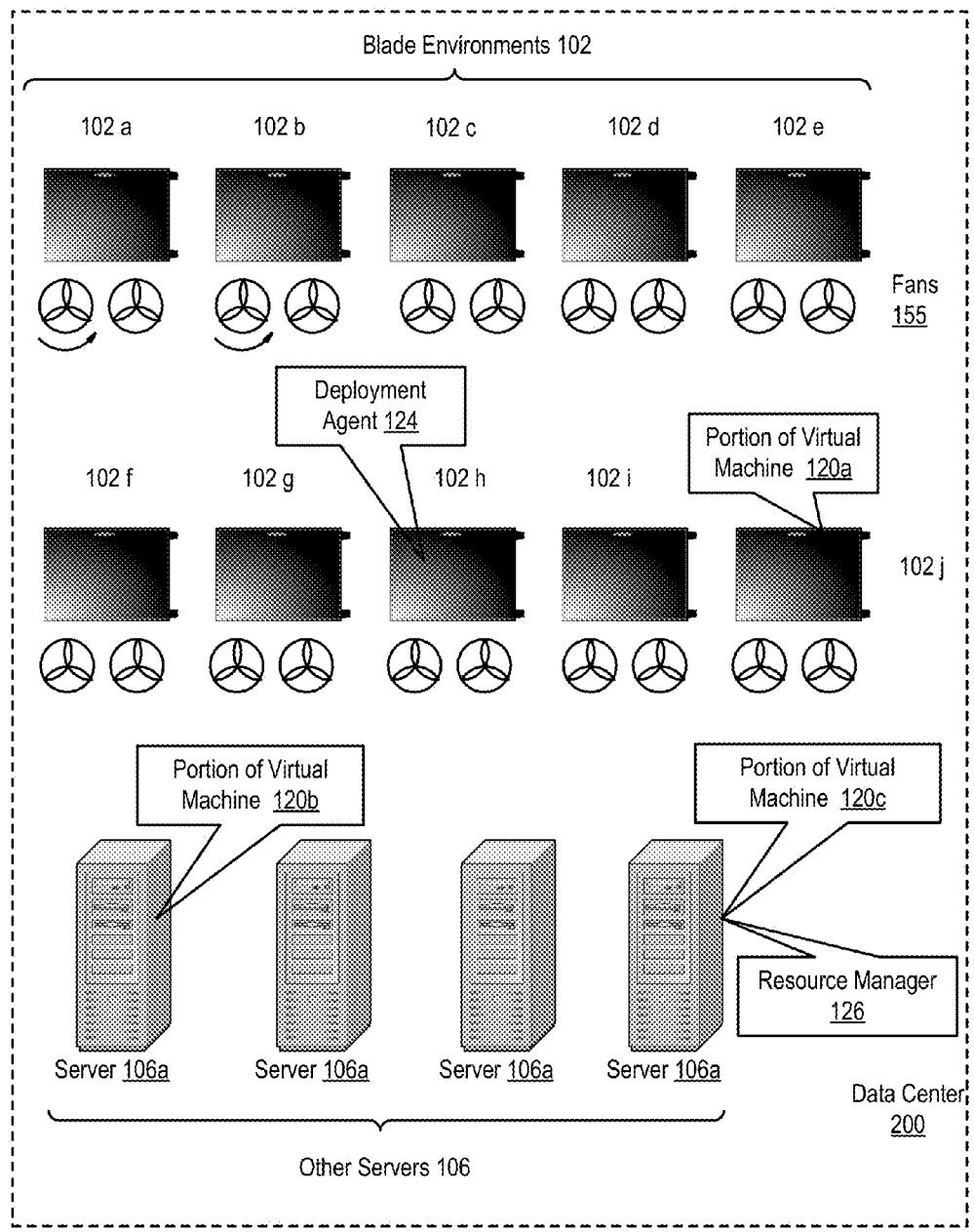
FIG. 1 sets forth a block diagram of a system for virtual machine administration for data center resource managers according to embodiments of the present invention.

Exemplary methods, apparatus, and products for virtual machine administration for data center resource managers in accordance with the present invention are described with reference to the accompanying drawings, beginning with FIG. 1. FIG. 1 sets forth a block diagram of a system for virtual machine administration for data center resource managers according to embodiments of the present invention. The system of FIG. 1 includes a data center (200). A data center is a facility used to house computer systems and associated components, such as telecommunications and storage systems. Data centers generally include redundant or backup power supplies, redundant data communications connections, environmental controls such as air conditioning and security devices and other computers and components as will occur to those of skill in the art.

Most of such resources in the data center may be administered by one or more resource managers deployed on one or more virtual machines administered in accordance with the present invention. A virtual machine is a software implementation of automated computing machinery, such as a computer, that executes programs like a physical machine. A virtual machine is often designed to be an efficient and isolated duplicate of a physical machine. A virtual machine as that term is used in this specification provides a complete system platform to supports the execution of a resource manager and therefore often supports a complete operating system or resources of the operation system necessary for execution of the resource manager. Such a virtual machine may be, and often is, distributed. That is, portions of virtual machines according to embodiments of the present invention may reside on multiple different physical machines.

A resource manager is a software program that administers the execution, configuration, or function of other resources both physical, such as hardware components of the data center, and logical, such as software modules executing in the data center. Such a resource manager may also be deployed in a distributed fashion on the virtual machine in accordance with the present invention. That is, the resource manager may be deployed on portions of the virtual machine which is itself deployed on more than one physical machine.

The data center (200) of FIG. 1 includes a plurality of blade environments (102). 'Blade environment,' as the term is used in this specification, refers generally to a blade server system installed in a chassis and including a number of resources such as blade servers, one or more blade management modules, a media tray, a blade server system power supply, fans for cooling, and other components which may be managed by a resource manager deployed on a virtual machine administered in accordance with the present invention. One example of a blade environment useful in virtual machine administration for data center resource managers according to embodiments of the present invention is the BladeCenter available from IBM®.

The data center (200) of FIG. 1 includes a plurality of other servers (106) that also include resources, both physical and logical, that may be both managed by a resource manager deployed according to embodiments of the present invention, as well as be resources upon which the virtual machine supporting the resource manager is deployed according to embodiments of the present invention.

In the example of FIG. 1, a deployment agent (124) is installed on blade environment (102h). The deployment agent (124) is a module of automated computing machinery for virtual machine administration for data center resource managers according to embodiments of the present invention. The deployment agent (124) includes computer program instructions for virtual machine administration for data center resource managers by discovering the resources of the datacenter to be managed by the resource manager; determining, in dependence upon attributes of the resources of the datacenter to be managed, processing capabilities of the discovered resources; determining, in dependence upon attributes of the resources of the datacenter to be managed, memory capabilities of the discovered resources; determining, in dependence upon attributes of the resources of the datacenter to be managed, minimum memory requirements for managing the discovered resources; determining, in dependence upon attributes of the resources of the datacenter to be managed, minimum processing requirements for managing the discovered resources; deploying, by the deployment agent in dependence upon the determined processing capabilities and memory capabilities upon one or more of the resources of the datacenter to be managed, a virtual machine having at least the minimum memory requirements and the minimum processing requirements; and deploying, by a deployment agent, the resource manager on the virtual machine.

In the example of FIG. 1, the deployment agent (124) discovers the resources of the datacenter to be managed by the resource manager. The deployment agent may discover resources of the datacenter to be managed by, for example, sending a Service Location Protocol ('SLP') request over the network and receiving from various resources SLP responses. Each resource so sending an SLP response may be polled for resource identifications, capabilities, potential management requirements and other information as will occur to those of skill in the art. As mentioned above, the resources to be managed may be physical or logical. Examples of such resources include processors, input/output modules, blade servers, software components, operating systems, fans, data, databases, network resources, storage area networks, memory, and many others as will occur to those of skill in the art.

In the example of FIG. 1, a virtual machine supporting the resource manager is deployed on one or more of the resources of the data center itself. As such, some resources managed by the resource manager provide computing contributions to the virtual machine—not just consumption—and therefore in virtual machine administration according to the present invention, those resource contributions are taken into consideration along with resource consumptions when deploying an appropriate virtual machine for the resource manager.

The deployment agent (124) of FIG. 1 also determines in dependence upon attributes of the resources of the datacenter to be managed processing capabilities and memory capabilities of the discovered resources. Attributes of the resource may include the type and kind of the resource, manufacturer ratings of the resource. The type of capabilities for the resource, the type of management requirements for the resource, the uses of the resource, any many others as will occur to those of skill in the art.

In some embodiments of the present invention, the deployment agent may poll each resource selected for management by the resource manager for its processing capabilities and its memory capabilities. In some alternative embodiments, the deployment agent may maintain a list of identifications of resources and their processing capabilities and their memory capabilities.

Turning briefly to FIG. 2, FIG. 2 sets forth a table (800) of resource contributions of the example resources discovered. In the example of FIG. 2, the table (800) includes descriptions of the discovered resources (802) and the number (804) of how many of each type of resources was discovered. In the example of FIG. 2, three fans of 'Fan Type A' were discovered, six fans of 'Fan Type B' were discovered, four software module called 'Software Module A' were discovered, two compute nodes were discovered, five I/O modules were discovered and one external storage area network was discovered.

The table (800) of FIG. 2 also includes the processor contributions (806) and memory contributions (808) that will benefit the virtual machine supporting the resource manager managing each of the discovered resources. In the example of FIG. 2, a Type A fan contributes no FLOPS of processor capability and no memory capability for a virtual machine. In the example of FIG. 2, a Type B fan contributes no FLOPS of processor capability and no memory capability for a virtual machine. The discovered software module of the type of 'Software Module A' contributes no FLOPS of processor capability and no memory capability for a virtual machine. The discovered compute node contributes 100000 FLOPS of processor capability and 400000 bytes of memory capability to a virtual machine. In the example of FIG. 2, an I/O module contributes no FLOPS of processor capability and no memory capability for a virtual machine. And the discovered external SAN contributes no FLOPS of processor capability and no memory capability for a virtual machine. Having determined the processor contributions and memory contributions of each type of discovered resources and the total number of each type of discovered resource a deployment agent may calculate the total processor contributions and the total memory contribution capable of being provided to a virtual machine by the discovered resources.

Again with reference to FIG. 1: The example deployment agent (124) of FIG. 1 determines the memory capabilities and processing capabilities for contribution to a virtual machine deployed on one or more of the resources of the data center (200). Typically the deployment agent (124) determines the memory capability and processing capability in dependence upon the processing and memory contributions of each type of discovered resource and the number of such resources discovered.

The deployment agent (124) of FIG. 1 also determines, in dependence upon attributes of the resources of the datacenter to be managed, minimum memory requirements and minimum processing requirements for managing the discovered resources. Attributes of the resource may include the type and kind of the resource, manufacturer ratings of the resource, the type of management requirements for the resource, the uses of the resource, any many others as will occur to those of skill in the art. In some embodiments of the present invention, the deployment agent may poll each resource selected for management by the resource manager for its minimum processing requirements and its minimum memory requirements. In some alternative embodiments, the deployment agent may maintain a list of identifications of resources and their processing requirements and their memory requirements.

Turning briefly to FIG. 3, FIG. 3 sets forth a table (700) of resource requirements of some example resources capable of being discovered and capable of being managed by a resource manager in accordance with the present invention. In the example of FIG. 3, the table (700) includes descriptions of the discovered resources (702) and the number (704) of how many of each type of resources was discovered. In the example of FIG. 3, three fans of 'Fan Type A' were discovered, six fans of 'Fan Type B' were discovered, four software module called 'Software Module A' were discovered, two compute nodes were discovered, five I/O modules were discovered and one external storage area network was discovered.

The table (700) of FIG. 3 also includes the processor requirements (706) and memory requirements (708) for managing each type of discovered resources. In the example of FIG. 3, a Type A fan requires 300 floating point operations per second ('FLOPS') of processor capacity and 2 bytes of memory capacity to manage that type of discovered fan. In the example of FIG. 3, a Type B fan requires 150 FLOPS of processor capacity and 2 bytes of memory capacity to manage that type of discovered fan. The discovered software module of the type of 'Software Module A' requires 3000 FLOPS of processor capacity and 8000 bytes of memory capacity to manage that type of discovered software module. The discovered compute node requires 1000 FLOPS of processor capacity and 4000 bytes of memory capacity to manage that type of compute node. In the example of FIG. 3, an I/O module requires 500 FLOPS of processor capacity and 1000 bytes of memory capacity to manage that type of I/O module. And the discovered external SAN requires 1000 FLOPS of processor capacity and 2 bytes of memory capacity to manage that type of storage area network. Having determined the processor capacities and memory capacities of each type of discovered resources and the total number of each type of discovered resource a deployment agent may calculate the total minimum processor requirements and the total minimum memory requirements for managing the totality of discovered resources.

Again with reference to FIG. 1: The deployment agent (124) of FIG. 1 determines the minimum memory requirements and minimum processing requirements for managing all of resources selected for management by a particular resource manager. The deployment agent (124) typically determines the minimum memory requirements and minimum processing requirements in dependence upon the processing and memory requirements of each type of discovered resource and the number of such resources discovered.

In the example of FIG. 1, deployment agent (124) deploys a virtual machine having at least the minimum memory requirements and the minimum processing requirements onto one or more resources of the data center. The deployment agent (124) deploys the virtual machine upon selected resources in dependence upon the determined processing capabilities and memory capabilities contributed by the discovered resources. The deployment agent of FIG. 1 typically deploys a virtual machine having at least the minimum memory requirements and the minimum processing requirements by selecting one or more resources in the data center that together have the minimum memory requirements and the minimum processing requirements and deploying the virtual machine on the selected resources. In the example of FIG. 1 the a first portion of the virtual machine (120a) is deployed on blade environment (102j), a second portion of the virtual machine (120b) is deployed on server (106a), and a third portion of the virtual machine (120c) is deployed on server (106a).

The deployment agent of FIG. 1 may also deploy a virtual machine or a portion of the virtual machine to resources having appropriate cooling capability. In such embodiments, the deployment agent identifies minimum cooling requirements for the virtual machine and selects resources in the datacenter upon which to deploy at least a portion of the virtual machine and resource manager in dependence upon those minimum cooling requirements.

In the example of FIG. 1, deployment agent (124) deploys a resource manager on the virtual machine. In the example of FIG. 1, the resource manger is shown executing on the third portion (120c) of the virtual machine on server (106a). The blade environments, servers, deployment agent locations, locations of the deployed virtual machine, and resource manager are provided for explanation and not for limitation. In fact, virtual machine administration for data center resource managers may include many different resources and different configurations of virtual machines deployed on those resources as will occur to those of skill in the art.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 4:
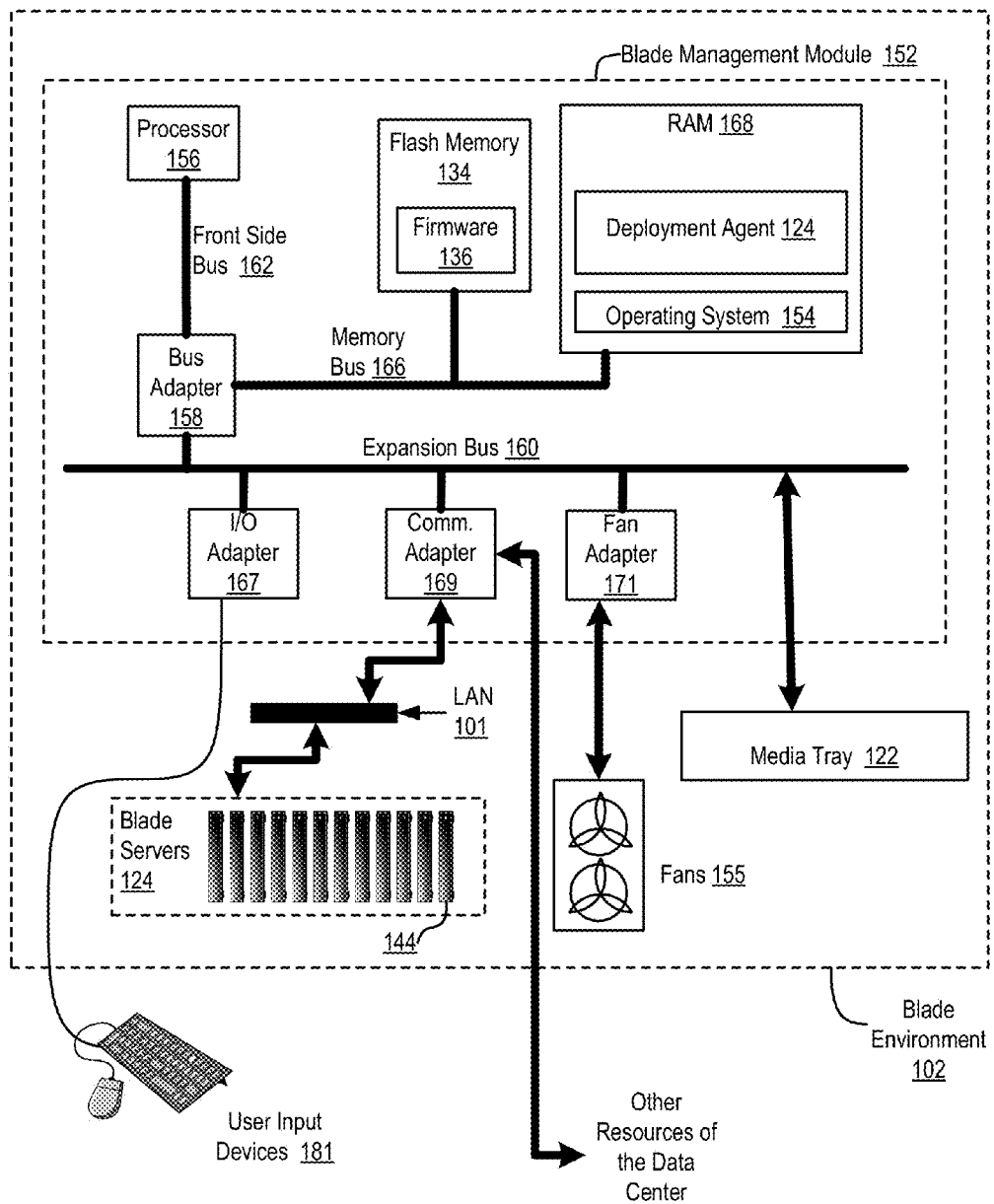
FIG. 4 sets forth a diagram of a further example data processing system useful in virtual machine administration for data center resource managers according to embodiments of the present invention.

For further explanation, FIG. 4 sets forth a diagram of a further example data processing system useful in virtual machine administration for data center resource managers according to embodiments of the present invention. The example data processing system of FIG. 4 includes a blade environment (102), blade servers (124) connected through an internal LAN (101) to a blade management module (152), fans (155), a media tray (122) connected to the blade management module all resources capable of being managed by a resource manager deployed in accordance with the present invention. In addition, FIG. 4 includes a functional block diagram showing detail of the blade management module (152). The blade management module (152) of FIG. 1 includes at least one computer processor (156) or 'CPU' as well as random access memory (168) ('RAM') which is connected through a high speed memory bus (166) and bus adapter (158) to processor (156) and to other components of the blade management module (152).

Stored in RAM in this example is a deployment agent (124) a module of automated computing machinery capable virtual machine administration for data center resource managers. The deployment agent (124) is capable of discovering resources of the datacenter to be managed by a resource manager; determining, by in dependence upon attributes of the resources of the datacenter to be managed, processing capabilities of the discovered resources; determining, in dependence upon attributes of the resources of the datacenter to be managed, memory capabilities of the discovered resources; determining, in dependence upon attributes of the resources of the datacenter to be managed, minimum memory requirements for managing the discovered resources; determining, in dependence upon attributes of the resources of the datacenter to be managed, minimum processing requirements for managing the discovered resources; deploying, by the deployment agent in dependence upon the determined processing capabilities and memory capabilities upon one or more of the resources of the datacenter to be managed, a virtual machine having at least the minimum memory requirements and the minimum processing requirements; and deploying the resource manager on the virtual machine.

Also stored in RAM (168) is an operating system (154). Operating systems useful for virtual machine administration for data center resource managers according to embodiments of the present invention include UNIX™, Linux™, Microsoft Windows XP™, Microsoft Vista™, AIX™, IBM's i5/OS™, and others as will occur to those of skill in the art. The operating system (154) and the deployment agent (124) in the example of FIG. 4 are shown in RAM (168), but many components of such software typically are stored in non-volatile memory also, such as, for example, on a disk drive or in firmware (136) on an EEPROM drive, here shown as flash memory (134).

The exemplary blade management module (152) of FIG. 4 includes one or more input/output ('I/O') adapters (167). I/O adapters implement user-oriented input/output through, for example, software drivers and computer hardware for controlling output to display devices such as computer display screens, as well as user input from user input devices (181) such as keyboards and mice.

The exemplary blade management module (152) of FIG. 4 also includes a communications adapter (169) that couples the blade management module (152) internally within the blade environment (102) for data communications with blade servers (124) through a local area network (101) and externally to the data center management module (200). The networks (101) may be implemented, for example, as an Internet Protocol ('IP') network or an Ethernet™ network, an I²C network, a System Management Bus ('SMBus'), an Intelligent Platform Management Bus ('IPMB'), for example, and in other ways as will occur to those of skill in the art. Such a communications adapter (169) are electronic modules that implement the hardware level of data communications through which one computer sends data communications to another computer through a data communications network. Examples of communications adapters useful according to embodiments of the present invention include modems for wired dial-up communications, Ethernet (IEEE 802.3) adapters for wired data communications network communications, and 802.11 adapters for wireless data communications network communications.

The arrangement of the blade management module (152), the blade servers (124), and other devices making up the exemplary system illustrated in FIG. 4 are for explanation, not for limitation. Data processing systems useful according to various embodiments of the present invention for virtual machine administration for data center resource managers may include additional servers, routers, and other devices, not shown in FIG. 4, as will occur to those of skill in the art. Data processing systems useful according to various embodiments of the present invention for virtual machine administration for data center resource managers may also include different computers and servers and may take many different form factors. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 4.

Figure 5:
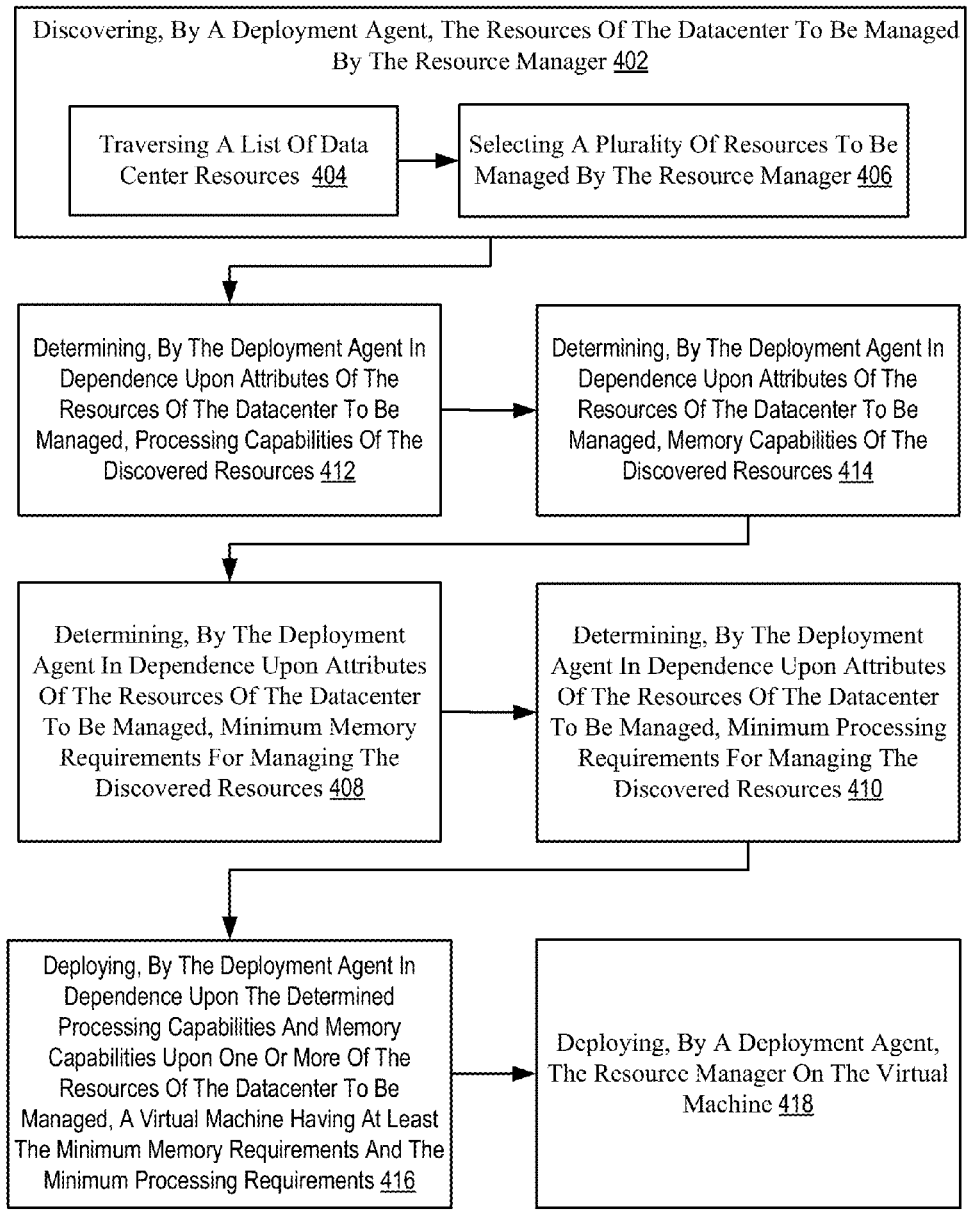
FIG. 5 sets forth a flow chart illustrating an exemplary method for deploying a virtual machine for a resource manager of a data center according to embodiments of the present invention.

For further explanation, FIG. 5 sets forth a flow chart illustrating an exemplary method for deploying a virtual machine for a resource manager of a data center according to embodiments of the present invention. Then method of FIG. 5 includes discovering (402), by a deployment agent, the resources of the datacenter to be managed by the resource manager. As mentioned above, the resources of the data center capable of being managed by the resource manager may be physical resources of the datacenter or logical resources of the datacenter. Examples of such resources include processors, input/output modules, blade servers, software components, operating systems, fans, data, databases, network resources, storage area networks, memory, and many others as will occur to those of skill in the art.

Discovering (412), by a deployment agent, the resources of the datacenter to be managed by the resource manager may be carried out by through sending a request to resources on a network and receiving responses to the request such as through the use of SLP or WS-Discovery. The Service Location Protocol ('SLP') is a resource discovery protocol that allows computers and other devices to find resources in a network without prior configuration. Web Services Dynamic Discovery (WS-Discovery) is a technical specification that defines a multicast discovery protocol to locate resources on a network. For example, discovering the resources of the datacenter to be managed by the resource manager may be carried out sending a Service Location Protocol ('SLP') request over the network and receiving from various resources SLP responses. Each resource so sending an SLP response may be polled for resource identifications, capabilities, potential management requirements and other information as will occur to those of skill in the art. The resources may then be selected for management and may be selected based upon the a number of factors such as type of resource to be managed, the ownership of the resource, the number of the type of resource or any other factor that will occur to those of skill in the art.

The method of FIG. 5 also includes determining (412), by the deployment agent in dependence upon attributes of the resources of the datacenter to be managed, processing capabilities of the discovered resources. In some embodiments, determining (412), by the deployment agent in dependence upon attributes of the resources of the datacenter to be managed, processing capabilities of the discovered resources may be carried out by polling each resource for the processing capabilities of the resource. In some other embodiments, determining (412), by the deployment agent in dependence upon attributes of the resources of the datacenter to be managed, processing capabilities of the discovered resources may be carried out by from a list or other data structure the processing capabilities of the resource.

The method of FIG. 5 also includes determining (414), by the deployment agent in dependence upon attributes of the resources of the datacenter to be managed, memory capabilities of the discovered resources. In some embodiments, determining (414), by the deployment agent in dependence upon attributes of the resources of the datacenter to be managed, memory capabilities of the discovered resources may be carried out by polling each resource for attributes of the resource that describe the memory capabilities of the resource. In some other embodiments, determining (414), by the deployment agent in dependence upon attributes of the resources of the datacenter to be managed, memory capabilities of the discovered resources may be carried out by retrieving from a list or other data structure the memory capabilities of the resource.

The method of FIG. 5 includes determining (408), by the deployment agent in dependence upon attributes of the resources of the datacenter to be managed, minimum memory requirements for managing the discovered resources. In some embodiments of the present invention, determining (408), by the deployment agent in dependence upon attributes of the resources of the datacenter to be managed, minimum memory requirements for managing the discovered resources may be carried out by polling each resource for its memory requirements. In some other embodiments of the present invention, determining (408), by the deployment agent in dependence upon attributes of the resources of the datacenter to be managed, minimum memory requirements for managing the discovered resources may be carried out retrieving from a list or other data structure the minimum memory requirements for managing the discovered resources. In other embodiments, determining (408) minimum memory requirements for managing the discovered resources may be carried out by calculating the memory requirements in dependence upon known factors such as physical architecture, network capabilities of the data center, physical layout of the data center, software available to the deployment agent and other factors that will occur to those of skill in the art.

The method of FIG. 5 also includes determining (410), by the deployment agent in dependence upon attributes of the resources of the datacenter to be managed, minimum processing requirements for managing the discovered resources. In some embodiments of the present invention, determining (410), by the deployment agent in dependence upon attributes of the resources of the datacenter to be managed, minimum processing requirements for managing the discovered resources may be carried out by polling each resource for its processing requirements. In some other embodiments of the present invention, determining (410), by the deployment agent in dependence upon attributes of the resources of the datacenter to be managed, minimum processing requirements for managing the discovered resources may be carried out by retrieving from a list or other data structure the processing requirements for the discovered resources. In other embodiments, determining (410) minimum processing requirements for managing the discovered resources may be carried out by calculating the memory requirements in dependence upon known factors such as physical architecture, network capabilities of the data center, physical layout of the data center, software available to the deployment agent and other factors that will occur to those of skill in the art.

The method of FIG. 5 includes deploying (416), by the deployment agent in dependence upon the determined processing capabilities and memory capabilities upon one or more of the resources of the datacenter to be managed, a virtual machine having at least the minimum memory requirements and the minimum processing requirements. Deploying (416), by the deployment agent in dependence upon the determined processing capabilities and memory capabilities upon one or more of the resources of the datacenter to be managed, a virtual machine having at least the minimum memory requirements and the minimum processing requirements is carried out by selecting one or more resources in the data center meeting the minimum memory and minimum processing requirements of the virtual machine and instantiating a virtual machine on the selected resources.

Deploying (416), upon one or more of the resources of the datacenter to be managed, a virtual machine having at least the minimum memory requirements and the minimum processing requirements may be carried out by selecting one or more resources in the data center that together have the minimum memory requirements and the minimum processing requirements and deploying the virtual machine on the selected resources. Deploying (416), upon one or more of the resources of the datacenter to be managed, a virtual machine having at least the minimum memory requirements and the minimum processing requirements may also be carried out by identifying, in dependence upon at least the minimum processing requirements for managing the discovered resources, minimum cooling requirements for the virtual machine; and selecting resources in the datacenter upon which to deploy at least a portion of the virtual machine and resource manager in dependence upon the minimum cooling requirements. Such cooling requirements may be met by selecting resources with heat sinks, fans, or other devices capable of cooling the resource such that the resource may meet the minimum processing requirements of the virtual machine.

The method of FIG. 5 also includes deploying (418), by a deployment agent, the resource manager on the virtual machine. Deploying (418), by a deployment agent, the resource manager on the virtual machine may be carried out by instantiating a resource manager for the discovered resources on the virtual machine.

Exemplary embodiments of the present invention are described largely in the context of a fully functional computer system for virtual machine administration for data center resource managers. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on a user's computer, as a stand-alone software package, partly on a user's computer and partly on a remote computer or entirely on the remote computer or server. In the latter scenario, the remote computer may be connected to a user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
    by first program instructions on a computing device,
        discovering resources of a datacenter to be managed by a resource manager;
        determining, in dependence upon attributes of one or more resources of the datacenter discovered to be managed by the resource manager, processing capabilities of each of the discovered resources to be managed;
        determining, in dependence upon attributes of the resources of the datacenter to be managed, memory capabilities of each of the discovered resources to be managed;
        determining, in dependence upon processing and memory requirements of each type and number of the resources of the datacenter to be managed, total memory requirements for managing the discovered resources of the data center to be managed;
        determining, in dependence upon processing and memory requirements of each type and number of the resources of the datacenter to be managed, total processing requirements for managing the discovered resources of the data center to be managed;
        deploying, in dependence upon the determined processing capabilities and memory capabilities upon one or more of the resources of the datacenter to be managed, a virtual machine on the resources of the datacenter to be managed, wherein the virtual machine has at least the total memory requirements and the total processing requirements for managing the discovered resources of the data center to be managed; and
        deploying-the resource manager on the virtual machine.

2. The method of claim 1 wherein the resources to be managed comprise physical resources of the datacenter.

3. The method of claim 1 wherein the resources to be managed comprise logical resources of the datacenter.

4. The method of claim 1 wherein deploying, upon one or more of the resources of the datacenter to be managed, the virtual machine further comprises:
    selecting one or more resources to be managed in the data center that together have the total memory requirements and the total processing requirements; and
    deploying the virtual machine on the selected resources to be managed.

5. The method of claim 1 wherein deploying, upon one or more of the resources of the datacenter to be managed, the virtual machine further comprises:
    identifying, in dependence upon at least the total processing requirements for managing the discovered resources, cooling requirements for the virtual machine; and
    selecting resources in the datacenter upon which to deploy at least a portion of the virtual machine and resource manager in dependence upon the cooling requirements.

6. The method of claim 1 wherein discovering the resources of the datacenter to be managed by the resource manager further comprises traversing a list of data center resources and selecting a plurality of resources to be managed by the resource manager.

7. Apparatus comprising a computing device, a computer processor, a computer memory operatively coupled to the computer processor, the computer memory having disposed within it computer program instructions for:
   discovering resources of the datacenter to be managed by a resource manager;
   determining, in dependence upon attributes of one or more resources of the datacenter discovered to be managed by a resource manager, processing capabilities of each of the discovered resources to be managed;
   determining, in dependence upon attributes of the resources of the datacenter to be managed, memory capabilities of each of the discovered resources to be managed;
   determining, in dependence upon processing and memory requirements of each type and number of the resources of the datacenter to be managed, total memory requirements for managing the discovered resources of the data center to be managed;
   determining, in dependence upon processing and memory requirements of each type and number of the resources of the datacenter to be managed, total processing requirements for managing the discovered resources of the data center to be managed;
   deploying, in dependence upon the determined processing capabilities and memory capabilities upon one or more of the resources of the datacenter to be managed, a virtual machine on the resources of the datacenter to be managed, wherein the virtual machine has at least the total memory requirements and the total processing requirements for managing the discovered resources of the data center to be managed; and
   deploying-the resource manager on the virtual machine.

8. The apparatus of claim 7 wherein the resources to be managed comprise physical resources of the datacenter.

9. The apparatus of claim 7 wherein the resources to be managed comprise logical resources of the datacenter.

10. The apparatus of claim 7 wherein computer program instructions for deploying, upon one or more of the resources of the datacenter to be managed, the virtual machine further comprise computer program instructions for:
    selecting one or more resources to be managed in the data center that together have the total memory requirements and the total processing requirements; and
    deploying the virtual machine on the selected resources to be managed.

11. The apparatus of claim 7 wherein computer program instructions for deploying, upon one or more of the resources of the datacenter to be managed, the virtual machine further comprise computer program instructions for:
    identifying, in dependence upon at least the total processing requirements for managing the discovered resources, cooling requirements for the virtual machine; and
    selecting resources in the datacenter upon which to deploy at least a portion of the virtual machine and resource manager in dependence upon the cooling requirements.

12. The apparatus of claim 7 wherein computer program instructions for discovering-the resources of the datacenter to be managed by the resource manager further comprise computer program instructions for traversing a list of data center resources and selecting a plurality of resources to be managed by the resource manager.

13. A computer program product including a non-transitory computer readable storage medium, the computer program product comprising computer program instructions capable, when executed, of causing a computer to carry out the steps of:
   discovering resources of the datacenter to be managed by a resource manager;
   determining, in dependence upon attributes of one or more resources of the datacenter discovered to be managed by a resource manager, processing capabilities of each of the discovered resources to be managed;
   determining, in dependence upon attributes of the resources of the datacenter to be managed, memory capabilities of each of the discovered resources to be managed;
   determining, in dependence upon processing and memory requirements of each type and number of the resources of the datacenter to be managed, total memory requirements for managing the discovered resources of the data center to be managed;
   determining, in dependence upon processing and memory requirements of each type and number of the resources of the datacenter to be managed, total processing requirements for managing the discovered resources of the data center to be managed;
   deploying, in dependence upon the determined processing capabilities and memory capabilities upon one or more of the resources of the datacenter to be managed, a virtual machine on the resources of the datacenter to be managed, wherein the virtual machine has at least the total memory requirements and the total processing requirements for managing the discovered resources of the data center to be managed; and
   deploying the resource manager on the virtual machine.

14. The computer program product of claim 13 wherein the resources to be managed comprise physical resources of the datacenter.

15. The computer program product of claim 13 wherein the resources to be managed comprise logical resources of the datacenter.

16. The computer program product of claim 13 wherein computer program instructions for deploying, upon one or more of the resources of the datacenter to be managed, the virtual machine further comprise computer program instructions for:
    selecting one or more resources to be managed in the data center that together have the total memory requirements and the total processing requirements; and
    deploying the virtual machine on the selected resources to be managed.

17. The computer program product of claim 13 wherein computer program instructions for deploying, upon one or more of the resources of the datacenter to be managed, the virtual machine further comprise computer program instructions for:
    identifying, in dependence upon at least the total processing requirements for managing the discovered resources, cooling requirements for the virtual machine; and
    selecting resources in the datacenter upon which to deploy at least a portion of the virtual machine and resource manager in dependence upon the cooling requirements.

18. The computer program product of claim 13 wherein computer program instructions for discovering-the resources of the datacenter to be managed by the resource manager further comprise computer program instructions for traversing a list of data center resources and selecting a plurality of resources to be managed by the resource manager.

\* \* \* \* \*